UNITED STATES PATENT OFFICE.

CHRISTIAN RUDOLPH, OF OFFENBACH-ON-THE-MAIN, GERMANY, ASSIGNOR TO THE FIRM OF K. OEHLER, OF SAME PLACE.

BROWN AZO DYE.

SPECIFICATION forming part of Letters Patent No. 516,380, dated March 13, 1894.

Application filed October 24, 1892. Serial No. 449,819. (Specimens.)

*To all whom it may concern:*

Be it known that I, CHRISTIAN RUDOLPH, a subject of the German Emperor, and a resident of Offenbach-on-the-Main, Germany, assignor to THE FIRM OF K. OEHLER, in the said city of Offenbach-on-the-Main, have invented new and useful Improvements in Brown Azo Dye-Stuffs, of which the following is a specification.

My invention consists in the production of a new brown azo dye stuff from diazotized toluylendiaminsulfoacid ($CH_3:NH_2:SO_3H:NH_2 = 1:2:4:6$) and meta-phenylendiamine.

The way of proceeding is the following: 10.1 parts by weight of toluylendiaminsulfoacid ($CH_3:NH_2:SO_3H:NH_2 = 1:2:4:6$) are dissolved in twenty-five parts by weight of soda lye of eight per cent. and mixed with a solution of 6.9 parts of sodium nitrite in two hundred parts of water cooled with ice. As soon as the formation of the diazo body is terminated, the solution is mixed with another solution of 10.3 parts of sulphate of meta-phenylendiamine in three hundred parts of water cooled to 0° centigrade. The precipitation of the so called intermediate body begins at once in the shape of a brownish black powder and will be finished in about four hours. I let the mixture stand for two days while stirring and allow the temperature to rise slowly to 20° centigrade; then I heat rapidly to 70° centigrade and let it grow cold again. The liquid is filtered off and the remaining dye stuff acid is dissolved in hot water adding a little soda and then precipitated with salt at boiling temperature. The transformation of the intermediate body can also be obtained in the following manner. As soon as the formation of the intermediate body is finished, which can be seen on a piece of paper being no more colored, I add a concentrated solution of seventy parts by weight of sodium acetate cooled with ice and have it stand at the common temperature for two days while stirring. A solution of thirty-five parts of soda is then brought in, slowly heated and at last, when the boiling point is attained, the dye stuff is precipitated by common salt.

If the intermediate compound is treated directly with soda, ammonia or caustic soda without the foregoing procedure with sodium acetate one obtains in all cases a dye stuff of a redder shade but equal to the first in all other points.

The dye stuff forms a blackish powder not soluble in alcohol and soluble in water with a brown color. Hydrochloric acid added to the watery solution produces a blackish brown precipitate. Concentrated sulphuric acid dissolves the dye stuff with a dirty violet red color.

The new brown dye stuff is especially fit for dyeing cotton in an alkaline bath in yellow brown shades and it distinguishes itself by its remarkable resistance to soaping.

What I claim as my invention, and desire to secure by Letters Patent, is—

1. The method of producing a new brown azo dye stuff by reacting on diazotized toluylendiaminsulfoacid with meta-phenylendiamine and separating the dye, substantially as set forth.

2. As a new article of manufacture, the azo dye stuff herein described consisting of a blackish powder derived from toluylendiaminsulfoacid and meta-phenylendiamine, dyeing cotton in an alkaline bath in yellow brown shades, being insoluble in alcohol but soluble in water with a brown color and soluble in concentrated sulphuric acid with a dirty violet color, and from the watery solution of which a blackish brown precipitate is obtained by the addition of hydrochloric acid, substantially as herein set forth.

In testimony whereof I have signed my name to this specification in the presence of two subscribing witnesses.

CHRISTIAN RUDOLPH.

Witnesses:
ALVESTO S. HOGUE,
JEAN GRUND.